Patented July 11, 1939

2,165,578

UNITED STATES PATENT OFFICE 2,165,578

HYDROUS SILICATE GEL AND METHOD OF MAKING THE SAME

Ernest Wayne Rembert, Plainfield, N. J., assignor to Johns-Manville Corporation, New York, N. Y., a corporation of New York No Drawing. Application April 29, 1935,
Serial No. 18,885

4 Claims. (Cl. 23—110)

This invention relates to a method of making hydrous silicates and particularly relates to a method of producing such hydrous silicates by means of a reaction between soluble or sparingly soluble metallic bases or salts and a soluble silicate in aqueous slurry. The ingredients preferably employed in carrying out the method of this invention are soluble or substantially insoluble or sparingly soluble bases or salts of amphoteric metals and soluble silicates such as sodium or potassium silicate, these ingredients being caused to react in an aqueous suspension or slurry.

The sparingly soluble bases or salts should preferably be somewhat more soluble than the silicates which are to be formed. Soluble salts or compounds of amphoteric metals may also be used in producing a satisfactory product, provided the process is carefully carried out as described hereinafter.

The products of this invention are hydrous silicates. The only gel having adsorptive properties which has been developed heretofore is the well known silica gel but the hydrous silicates of this invention although partaking of the nature of gels differ very appreciably from silica gel. Furthermore, it has been found that the presence of silica gel in the product is detrimental. The hydrous silicates produced in accordance with the method of this invention have much greater adsorptive properties for most purposes and in particular for decolorizing mineral oils and the like, than silica gel.

Furthermore, it has also been discovered that the reaction between soluble or sparingly soluble compounds of amphoteric metals and sodium silicate or potassium silicate in an aqueous slurry or suspension, should be carried out under particular conditions of time, proportions and alkali concentration so as to produce hydrous silicates having the most effective adsorption characteristics.

It has also been discovered that the hydrous silicates made as described hereinbefore must contain certain optimum percentages of combined water in order to obtain maximum decolorizing efficiency.

It is an object of this invention to disclose and provide an improved method of producing hydrous silicate products of amphoteric metals.

Another object is to disclose and provide an improved method of producing hydrous aluminum silicate having superior adsorptive properties.

A still further object of this invention is to provide an improved method of making hydrous silicates having adsorptive properties from water soluble silicates, such hydrous silicate products being substantially free from silica gel.

A still further object of this invention is to provide an improved method utilizing certain definite molal ratios, temperatures, pressures, concentrations, times, and other conditions whereby the most effective forms of hydrated silicates of amphoteric metals may be produced in finely divided form from salts and compounds of amphoteric metals and water soluble silicates.

These and other objects, uses and advantages of this invention will become apparent to those skilled in the art from the following detailed description of the invention.

In general, the method of this invention may be carried out by forming a slurry, suspension or solution in water of a soluble or sparingly soluble compound of an amphoteric metal and then slowly adding thereto a water soluble silicate such as sodium silicate in aqueous solution, preferably with accompanying agitation. The slurry, suspension or solution may be heated in order to facilitate the reaction. A sufficient quantity of a soluble base or alkali is preferably added to the slurry or solution so as to obviate the formation of silica jel. The characteristics of the resulting silicate may be varied by varying the character of sparingly soluble or soluble compound or salt of the amphoteric metal used and also by varying the rate at which the soluble silicate is added to such slurry, by altering the proportions of the reacting material present in the reaction mixtures, and by the control of other reacting conditions such as temperatures.

It has been found that if the water soluble silicate is added en masse or rapidly to the suspension or solution of the amphoteric compound in water, a hydrous silicate is formed but such product is dense, granular, and of very low efficiency as far as its adsorptive quality is concerned. Similarly, an inefficient product is generally produced by adding the suspension or solution of the compound of the amphoteric metal to the soluble silicate solution. It has been ascertained that these undesirable results are due to the presence during a given portion of the reaction period of an excessive amount of the soluble silicate. If, however, the soluble silicate is slowly added to the suspension or solution of the amphoteric compound in water, an active adsorbent of much lower density and of much better structure is obtained. In general it has been found highly desirable to have the addition of soluble silicate cover a period of at least one half to one hour, very good results being obtained when the period of addition consumes three to five hours. The time of reaction, therefore, is of great importance and should be kept clearly in mind. The addition of the soluble silicate is made continuously or in successive increments over this period, the quantity added at any given time being varied according to the particular reactants and reacting conditions employed. In general it has been found that very satisfactory results are obtained by adding the required quantity of soluble silicate at a uniform rate over the reaction period.

Any soluble salt or compound of an amphoteric metal may be used although the sparingly soluble basic compounds of such metals appear to produce better adsorptive agents. The chlorides, hydroxides, sulphates, carbonates as well as the oxides and hydroxides of zinc, tin, lead, copper or aluminum may be used.

The soluble silicate employed in the reaction may either be a commercial grade of sodium silicate or potassium silicate in concentrated aqueous solution or diluted. A sodium silicate containing 1 mole of $Na_2O$ to 3.34 mols of $SiO_2$ (conventional commercial strength) has been found to give very satisfactory results.

The reaction between the compound of the amphoteric metal in aqueous suspension and a soluble silicate may be carried out at ordinary room temperatures but the rate of reaction is accelerated by carrying on the reaction at an elevated temperature, for example, a temperature of say 150° F. to 212° F. The aqueous suspension of the compound of the amphoteric metal employed should be sufficiently fluid so as to permit ready agitation and pumping or discharge of the contents of the digestion or reaction kettle upon the completion of the reaction.

When a sparingly soluble basic material such as aluminum hydroxide is employed, it has been found desirable to introduce into the slurry a small proportion of a soluble alkali such as, for example, sodium carbonate, sodium hydroxide, or the like, for the purpose of preventing appreciable hydrolysis of the soluble silicate and the formation of silica gel. The initial concentration of the soluble alkali or base in the aqueous suspension or slurry may vary from about 0.02N to about 1.N depending somewhat upon the character of the soluble silicate employed.

When soluble salts of amphoteric metals are employed, the presence of a soluble alkali is likewise provided for in order to prevent the formation of silica gel, but in this case the soluble alkali serves to prevent the interaction of the amphoteric metal compound and the soluble silicate to produce silica gel and a complex salt.

As has been stated hereinbefore, it is important, in order to develop hydrous silicate gels of optimum adsorptive properties, to add the soluble silicate to the slurry, suspension or solution of the amphoteric compound slowly with continuous agitation. If, for example, a sodium silicate solution is added to a slurry containing aluminum hydroxide, the two being proportioned so as to give a molal ration of $Al_2O_3$ to $SiO_2$ of 0.5, rapid addition will produce a hard, granular hydrous silicate which exhibits a low adsorption efficiency when an attempt is made to use such silicate for decolorizing mineral oils. If, on the other hand, the silicate is added to the slurry of aluminum hydroxide in an aqueous solution containing some sodium carbonate, over a period of about four hours, with agitation, a very active hydrous silicate is obtained which is less dense and possesses an adsorption efficiency higher than any of the materials in use for petroleum decolorization at the present time.

The slow or gradual addition of soluble silicate to the suspension or solution is desired so as to form the desired structure in the product. The time consumed in making such addition may vary with the solubility of the compound of amphoteric metal suspended or dissolved in the reacting medium and the concentration of the soluble silicate which is added.

After the reaction has been completed, the suspension of hydrous silicate is filtered, settled, thickened, or otherwise treated so as to separate the reaction products or hydrous silicates in finely divided form, from the aqueous medium of the suspension.

The hydrous silicates resulting from the reaction may be washed with water in any suitable manner as, for example, by being reslurried and refiltered. It has been found that by treating the hydrous silicate reaction products with a dilute acid solution, preferably by slurrying the product with an acid solution of a concentration just sufficient to neutralize the free alkali, the adsorption efficiency of the products is enhanced.

Care should be taken in drying the hydrous silicate products of this invention. The product may be dried to a water content of about 15 to 20% without substantially impairing its effectiveness as an adsorbent. In drying, therefore, substantially only the free water should be removed in most instances.

The method of manufacturing the products made in accordance with this invention and their effectiveness will be further apparent from a consideration of the following specific examples.

*Example #1*

333 grams of aluminum sulphate $(Al_2SO_4.18H_2O)$ were dissolved in 3500 c. c. of water and 100 grams of sodium carbonate added. An excess of ammonium hydroxide was then added, the slurry boiled, the precipitate filtered off and washed with water. The precipitate was then reslurried in 2000 c. c. of water and 384 grams of sodium silicate solution diluted to 800 c. c. with water was added over a period of one half hour with constant agitation. The temperature was then raised to the boiling point to insure completion of the reaction. The slurry was then filtered, the precipitate washed with water, and a portion dried to a moisture content of 18.6. The dried material was brushed through a 30 mesh screen, then contacted with Pennsylvania cylinder stock in the ratio of one pound of dry material per gallon of oil at 400° F. according to the so-called "Contact" method of decolorizing mineral oils to produce a final dilute color (A. S. T. M.) of 5—.

A second portion of the aluminum silicate cake was reslurried with water, neutralized with 5% sulphuric acid solution, filtered, dried to a moisture content of 46.8% and contacted with Pennsylvania cylinder stock as above in the ratio of one pound material per gallon of oil on the dry basis to give a dilute color of 4¾—. This neutralized material compared very favorably with the conventional acid treated sub-bentonites normally employed as decolorizing materials.

By the addition of a soluble alkali to the slurry containing the aluminum hydroxide in amounts as previously described, a product of substantially higher decolorizing efficiency was produced.

Example #2

333 grams of aluminum sulphate were dissolved in 1800 c. c. of water to which was added 100 grams of sodium carbonate. 420 grams of sodium silicate diluted to 800 c. c. were then added over a period of one half hour to the slurry, with agitation. This mixture was allowed to stand over night at room temperature after which the precipitate was filtered off, washed, and dried to a moisture content of 42.3%. The dry material was then brushed through a 30 mesh screen and contacted with Pennsylvania cylinder stock as above in the same proportion. The resulting color of the oil was determined as 5— (A. S. T. M. dilute).

Example #3

333 grams of aluminum sulphate were dissolved in 2000 c. c. of water and 180 grams of soda ash added. The slurry was filtered, precipitate washed, and reslurried in 2000 c. c. of water to which 250 grams of sodium silicate were added over a period of seven hours, forty minutes. The precipitate was then washed with water and a portion dried to a moisture content of 17.1%. The remaining portion of the wet cake was reslurried in water, neutralized with 5% solution of sulphuric acid, dried to moisture content of 30.5%. Both materials were brushed through 30 mesh screen and contacted with Pennsylvania cylinder stock as above giving A. S. T. M. colors of 5¾ and 4¾ respectively.

From the proportion of the aluminum salt to sodium silicate given in the foregoing description, it is evident that the ratio of alumina ($Al_2O_3$) to silica ($SiO_2$) in the insoluble silicate product is in the range of about 1 alumina to about 2 to 6 of silica.

Example #4

Material made according to Example #1 including neutralization with acid and drying to a moisture content of 49.4% was contacted with Pennsylvania cylinder stock at various temperatures in the proportion of one pound of bone dry material per gallon of oil. When contacted at 500° F. a dilute color of 4¾+ was obtained, while contacting at 400° F. a dilute color of 5 was obtained. The dry equivalent of an acid treated sub-bentonite used in the same proportions at 500° F. give a dilute color of 5¼.

Another portion of this same material dried to a moisture content of 29.8% when contacted at 500° F. gives a dilute color 4¾. When contacted at 400° F. a dilute color of 5— was obtained while at 350° F. a dilute color of 5½— was obtained. When the same material was dried to 11.7% moisture, in contact with oil at 500° F. a dilute color of 5+ was obtained.

These results show that the aluminum silicate to develop excellent decolorizing efficiency required a temperature of 500° F. or higher. Furthermore, it indicated that a material cannot be satisfactorily dried below approximately 20% without loss in decolorizing efficiency.

Example #5

Hydrous aluminum silicate was manufactured according to procedure outlined in Example #1 above. This product was then converted into a granular material for use in the so-called "percolation process" of decolorizing mineral oils by the following procedure. A portion of this material was dried to a moisture content of 13.1%, crushed, and screened to obtain a fraction passing 20 mesh and on 60 mesh. A second portion of the same material after neutralization was deflocculated by mixing in a double arm type dough mixer, then dried to a moisture content of 12.2%, the dried material being screened as above to give a 20–60 mesh material. These materials are then charged to small percolation filters and a 50% solution of Pennsylvania cylinder stock in conventional filter plant naphtha percolated through 40 grams of each, at 160° F. These samples passed 100 c. c. of oil having composite colors of the filtered solution of 4¾+ and 4½ respectively, these results being very comparable with those obtainable from a hydrous magnesium silicate on a weight basis.

Example #6

323 grams of ferric chloride ($FeCl_3.6H_2O$) were dissolved in 3000 c. c. of water and 177 grams of soda ash added. This mixture was heated to the boiling point, and then filtered and washed. The precipitate was reslurried in 1500 c. c. of water and 605 grams of sodium silicate diluted to 800 c. c. with water was added over a period of ¾ hour. This material was then filtered, washed with water, and dried to a moisture content of 35.3%, then brushed through a 30 mesh screen and contacted with Pennsylvania cylinder stock as above. A dilute color of 9 was obtained as compared with 4¾ in the case of aluminum silicate.

It will be apparent to those skilled in the art that numerous changes and modifications can be made and as a result of such changes and modifications, give rise to silicate products of different physical properties. In this manner, the physical characteristics of the products can be varied, depending upon the use to which they are to be put. The changes may comprise variation in the type or character of the compound or salt of amphoteric metal used as one of the raw ingredients, variations in the rate at which the soluble silicate is added to the suspension or solution, variation in the effective soluble silicate concentration in the reactive medium during reaction, and variation in the degree or extent of drying or acid treatment of the product.

All such changes and modifications as come within the scope of the appended claims are embraced thereby.

The present application is a continuation in part of my copending application Serial Number 529,281 filed April 10, 1931, Patent No. 1,999,210, issued April 30, 1935.

Hydrous silicates of high decolorizing efficiency may also be produced in accordance with the present invention from the interaction of soluble compounds of the alkaline earth metals such as magnesium sulphate, and alkali metal silicates such as sodium silicate. The slow addition of the alkali metal silicate is of equal importance in this instance, and the reacting conditions and proportions of the reactants being preferably as set forth in the above identified copending application.

What I claim is:

1. In a process of producing insoluble silicates, the steps of disseminating a slightly soluble compound of amphoteric metal in an aqueous medium, and slowly adding a soluble silicate to such medium in amount suitable to precipitate a simple silicate of the amphoteric metal and at a rate adapted to maintain a soluble silicate concentration in such medium during reaction below the concentration at which an insoluble silicate is formed of a dense granular structure having a relatively low adsorption efficiency, the said rate being such that the time consumed in adding the soluble silicate is of the order of at least one-half hour.

2. In a process of producing insoluble silicates, the steps of disseminating a slightly soluble compound of amphoteric metal in an aqueous medium, slowly adding a soluble silicate to such medium in amount suitable to precipitate a simple silcate of the amphoteric metal and at a rate adapted to maintain a soluble silicate concentration in such medium during reaction below the concentration at which an insoluble silicate is formed of a dense granular structure having a relatively low adsorption efficiency, and then separating the solid silicate reaction products from the aqueous medium.

3. In a process of producing insoluble silicates for use as a decolorizing agent, the steps of disseminating a slightly soluble compound of an amphoteric metal in an aqueous medium, slowly adding a soluble silicate to such medium in amount suitable to precipitate a simple silicate of the amphoteric metal, the rate of addition of the soluble silicate being such as to maintain its concentration below that concentration at which an insoluble silicate having a dense granular structure and low adsorption efficiency is formed, then separating the solid silicate reaction products from the aqueous medium, and subjecting said solid reaction products to the action of an acid solution.

4. In a process of producing an insoluble silicate for use as a decolorizing agent, the steps of disseminating a slightly soluble compound of aluminum in an aqueous medium, and slowly adding a soluble silicate to such medium in amount suitable to precipitate a simple silicate of the amphoteric metal and at a rate adapted to maintain a soluble silicate concentration in such medium during reaction below the concentration at which an insoluble silicate is formed of a dense granular structure having a relatively low adsorption efficiency.

ERNEST WAYNE REMBERT.